United States Patent [19]

Kino

[11] Patent Number: 4,457,224
[45] Date of Patent: Jul. 3, 1984

[54] APPARATUS FOR STRIPPING ONIONS

[75] Inventor: Mitsutaro Kino, Yokohama, Japan

[73] Assignee: Fuji Foods Engineering Co., Ltd., Yokohama, Japan

[21] Appl. No.: 365,947

[22] Filed: Apr. 6, 1982

[30] Foreign Application Priority Data

| Nov. 21, 1981 [JP] | Japan | 56-187361 |
|---|---|---|
| Nov. 21, 1981 [JP] | Japan | 56-187362 |
| Nov. 21, 1981 [JP] | Japan | 56-187363 |
| Nov. 21, 1981 [JP] | Japan | 56-187364 |
| Nov. 21, 1981 [JP] | Japan | 56-187365 |
| Nov. 21, 1981 [JP] | Japan | 56-187366 |
| Nov. 21, 1981 [JP] | Japan | 56-187367 |
| Nov. 21, 1981 [JP] | Japan | 56-187368 |
| Nov. 21, 1981 [JP] | Japan | 56-187369 |

[51] Int. Cl.³ .................................... A23N 7/00
[52] U.S. Cl. ........................... 99/516; 99/472; 99/584; 426/482
[58] Field of Search ............... 99/487, 516, 534, 536, 99/539, 540, 584, 586, 621, 623-629, 646 R; 426/482, 518, 483, 519; 241/7, 8, 9, 39, 40; 209/144

[56] References Cited

U.S. PATENT DOCUMENTS 3,543,824 12/1970 Parsons ...................... 99/516 X
4,335,151 6/1982 Caubet ........................... 426/482

Primary Examiner—Timothy F. Simone
Attorney, Agent, or Firm—Flynn, Thiel, Boutell & Tanis

[57] ABSTRACT

An apparatus for stripping onions, in which an onion is withdrawn into a cylindrical onion guide path by vacuum pressure produced as compressed air is discharged at a high speed from a nozzle and is discharged from the cylindrical path into a separating chamber facing the path due to the momentum of the onion, whereby the onion is stripped as it is struck by compressed air discharged from the nozzle. The cylindrical onion guide path has a diameter large enough to permit passage of one onion, and onions are supplied one after another at a predetermined interval. The separating chamber is a cylindrical path coaxial with the onion guide path. The lines of discharge of the compressed air intersect one another on the center line of the onion guide path. Beyond the separating chamber, there is provided a direction converter for converting the axial direction of progress of the stripped onion into a lateral direction. The peelings separated from the stripped onion are led through the direction converter and are discharged through a separate route.

18 Claims, 10 Drawing Figures

4,457,224

APPARATUS FOR STRIPPING ONIONS

FIELD OF THE INVENTION

This invention relates to an apparatus for stripping onions, and more particularly to such an apparatus in which onions withdrawn one after another by a vacuum pressure produced by a jet of compressed air are stripped as they are struck by the jet of compressed air.

BACKGROUND OF THE INVENTION

For stripping onions, it has been in general practice to preliminarily provide the onions with longitudinal cuts with blades or the like and subsequently strip the onions by blowing compressed air against them. In this prior art technique, a process of forming onions with longitudinal cuts is necessary. This process requires a great deal of time and labor, as well as complicating the apparatus and leading to increased cost thereof.

The inventor has conducted extensive research and investigations to develop an apparatus which can strip onions without preliminarily forming longitudinal cuts but in a state having the root. In the prior art, a cylindrical onion guide path having a relatively large diameter has been proposed to guide a plurality of onions, of large and small sizes, at one time. A separating chamber in the form of a crown-shaped cylindrical chamber having a middle spherical crown portion, is disposed to face the onion outlet of the onion guide path. The plurality of onions fed into the separating chamber are acted upon by a vortex flow of compressed air and are caused thereby to rub one another so as to be stripped. The stripped onions are successively discharged, while the peelings are blown away. In practice in this apparatus, however, the air speed is reduced when a plurality of onions are located in the spherical chamber mentioned above. Therefore, it is difficult to obtain smooth discharge of the stripped onions, and clogging is liable to occur in the separating chamber. Once the clogging occurs, onions can neither be moved through the onion guide path nor stripped any further.

A first object of the invention is to provided an apparatus for stripping onions, in which the construction of the onion guide path and separating chamber is improved so as to eliminate the afore-mentioned clogging of the separating chamber and also in which onions are supplied one after another at a predetermined time-wise or distance-wise interval.

A second object of the invention is to provide an apparatus for stripping onions, in which the onion can be discharged correctly toward the center of the separating chamber and can also be protected from a bruise or other damage that might otherwise be caused as the onion strikes the peripheral wall of the separating chamber.

A third object of the invention is to provide an apparatus for stripping onions, in which a nozzle structure of a compressed air arrangement provided on the outer periphery of the onion guide path is simplified, and also which permits the adjustment of the speed of compressed air discharged from the nozzle and permits a change of onion guide paths of different diameters to be readily made.

A fourth object of the invention is to provide an apparatus for stripping onions, in which the stripped onions can be smoothly and reliably discharged while peelings are discharged through a separate route.

The above and further objects and features of the invention will become more apparent from the following detailed description thereof by having reference to the accompanying drawings.

DETAILED DESCRIPTION

The apparatus according to the invention will now be described with reference to FIGS. 1 through 4. A tubular cylinder 10 which forms a substantially straight cylindrical path or opening 1 (FIG. 5) extending in the vertical direction is supported for vertical movement by an outer tubular cylinder 20. The path 1 constitutes a guide path for guiding onions (a) upwardly moved therethrough, and it has a diameter large enough to permit passage of one onion.

Figure 5:
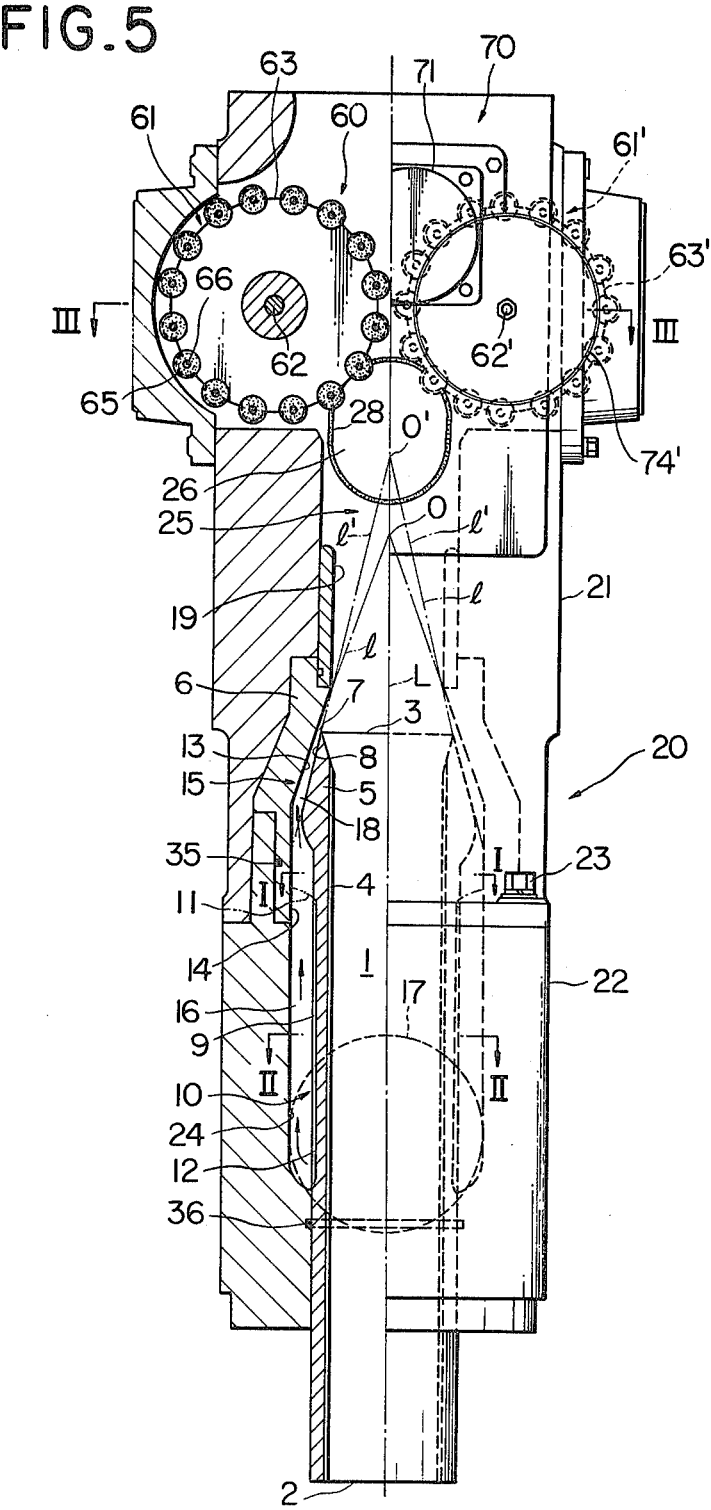
FIG. 5 is a longitudinal elevational view, partly in section, showing the internal construction of an outer cylinder.
Figure 7:
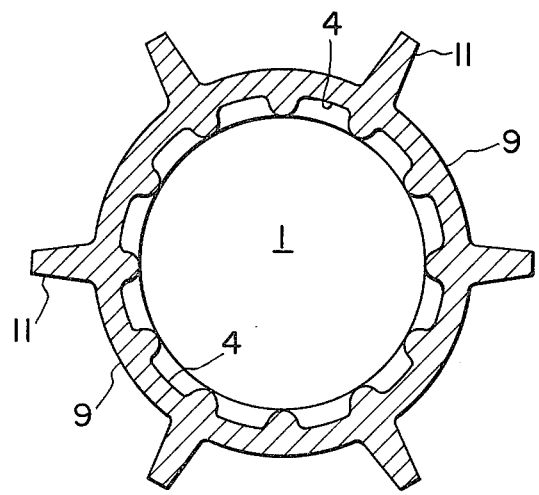
FIG. 7 is a sectional view of an inner cylinder taken along line I—I in FIG. 5.
Figure 8:
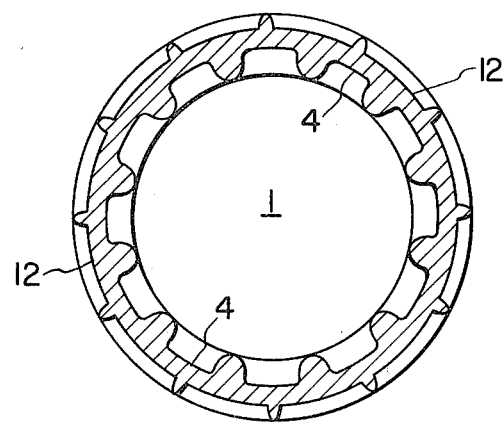
FIG. 8 is a sectional view of an inner cylinder taken along line II—II in FIG. 5.

Generally, onions are classed according to their diametrical size into large onions ranging in diameter from 95 to 120 mm (from 3.74 to 4.72 inch), medium onions ranging from 80 to 95 mm (from 3.15 to 3.74 inch) and small onions ranging from 60 to 80 mm (2.36 to 3.14 inch), and it is desirable to prepare a plurality of paths 1 having different inner diameters to meet this classification. The lower open end of the cylinder 10 constitutes an onion inlet 2 of the path 1, while the upper open end of the cylinder constitutes an onion outlet 3 of the path 1. Suitably, the inner peripheral wall of the cylinder 10 is provided over the entire length thereof with a plurality of helical grooves 4 (FIGS. 5 and 7).

The outer cylinder 20 is supported on a base frame 30 (FIG. 3), and it consists of upper and lower halves 21 and 22 secured by a bolt 23 to each other. A lower portion of the cylinder 10 projects from the lower end of the lower half 22 of the outer cylinder 20. The cylinder 10 is slidably supported at its intermediate portion and upper portion by the respective lower and upper halves 22 and 21 of the outer cylinder. A vertical motion drive 50 to be described later is coupled to the lower portion of the cylinder 10 to permit adjustment of the aperture of a compressed air discharge port provided at the top of the cylinder 10 and also to permit removal and reinstallation of the cylinder 10.

Below the cylinder 10, an onion feeder 40 (FIG. 1) for supplying onions (a) one after another at a predetermined interval is mounted on the base frame 30.

Now, the apparatus will be described with reference to FIGS. 5 through 8. A compressed air discharge structure 15 is provided on the outer periphery of an upper portion of the cylinder 10. It is inclined such that the lines of flow of compressed air emerging from it intersect one another at a point on the center line of the path 1 above the outlet 3 thereof. More particularly, the outer periphery of an upper portion of the cylinder 10 is formed with an integral nozzle 5 (FIG. 6), and a nozzle receiver 6 facing the nozzle 5 is secured to the inner periphery of the upper half 21 of the outer cylinder 20. Between the nozzle 5 and the nozzle receiver 6 is formed an annular compressed air discharge port 7. The nozzle 5 has an outer peripheral surface 8 of a frustoconical taper. The lower end or stem of the tapered outer peripheral surface 8 has a greater diameter than the outer diameter of the cylinder 10 and is curved to terminate in the outer surface of the cylinder 10. A plurality of helical blades 11 defining helical grooves 9 are provided in a circumferentially spaced-apart relation such that they extend downwardly from the stem of the nozzle to an adjacent portion of the outer surface of the cylinder 10. The helical grooves 9 communicate with helical gooves 12 formed in an intermediate portion of the outer surface of the cylinder 10. The number of the helical grooves 12 is greater than the number of the helical grooves 9.

The helical grooves 4 provided in the inner peripheral wall of the path 1 and the helical grooves 9 and 12 provided in the outer peripheral wall spiral in the same direction.

The nozzle receiver 6 secured to the inner wall of the outer cylinder 20 has a tapered inner peripheral surface 13 facing the tapered outer periphery 8 of the nozzle 5. The tapered inner surface 13 mentioned above terminates in a cylindrical cylinder support surface 14. The outer periphery of the helical blades 11 is supported for vertical movement by the cylinder support surface 14, whereby the upper portion of the cylinder 10 can be supported coaxially and for vertical movement by the upper half 21 of the outer cylinder via the cylinder support surface 14.

The tapered outer peripheral surface 8 and tapered inner peripheral surface 13 have slightly different inclinations to provide the compressed air discharge port 7 with a throttling effect. The extensions l of the tapered inner peripheral surface 13 intersect one another at a point O on the center line L of the path 1, and the extensions l' of the tapered outer peripheral surface 8 intersect one another at a point O' of the line L above the point O.

Figure 1:
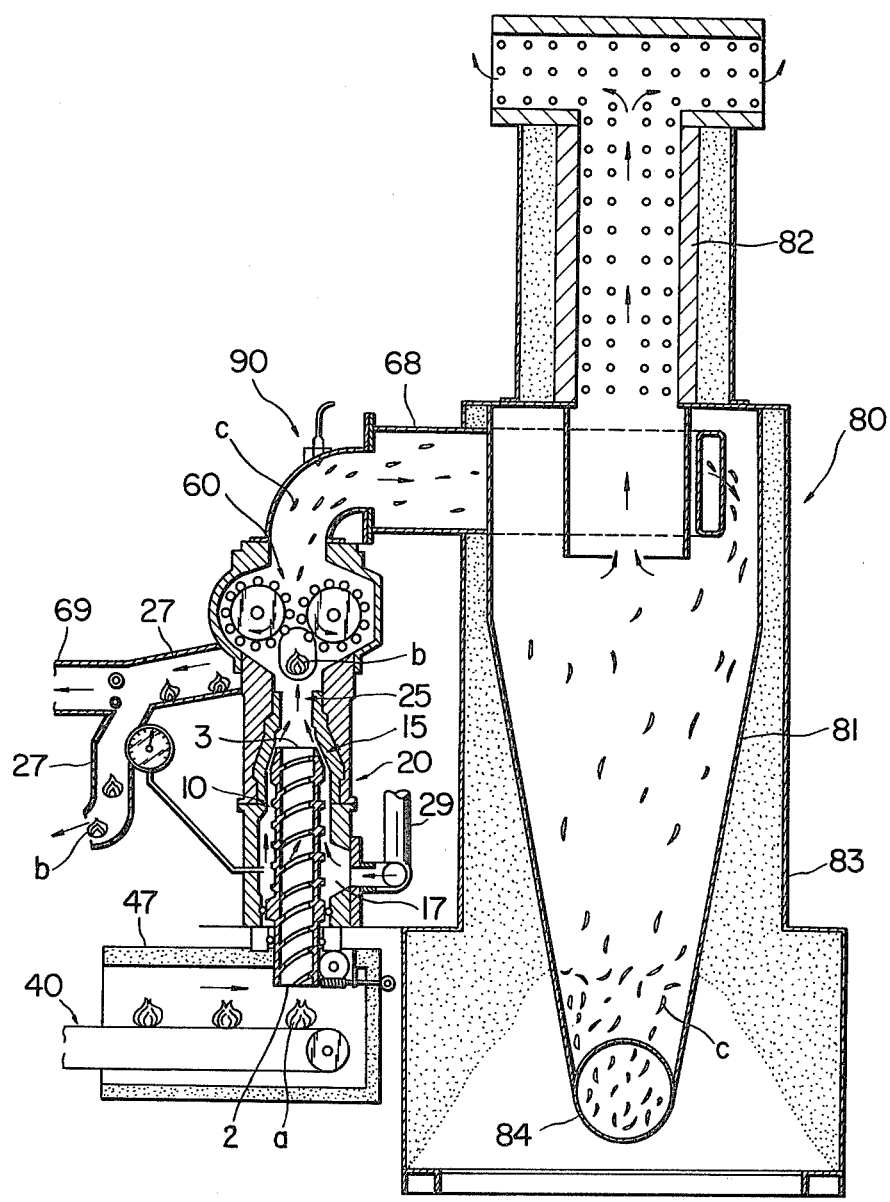
FIG. 1 is a schematic longitudinal elevational sectional view showing the apparatus according to the invention.

The cylindrical support surface 14 terminates in a curved surface 24 constituting the inner periphery of the lower half 22 of the outer cylinder 20. An annular compressed air guide path 16 is formed by the outer periphery of the cylinder 10, curved surface 24 and cylinder support surface 14. The lower end of the air guide path 16 communicates with an external compressed air source (not shown) via an air inlet 17 formed in the peripheral wall of the lower half 22 of the outer cylinder and an air supply duct 29 (FIG. 1). The other end of the air guide path 16 communicates with the compressed air discharge port 7 via the helical grooves 9 between adjacent helical blades 11 and the inclined path 18 defined by the tapered outer peripheral surface 8 and tapered inner peripheral surface 13. Designated at 19 is a cylindrical guide surface provided adjacent to the end of the tapered inner peripheral surface 13 of the nozzle receiver 6. The guide surface 19 may be omitted. The nozzle receiver 6 is provided with an O-ring 35 which sealingly engages the lower half 22 of outer cylinder 20.

An intermediate portion of the cylinder 10 is hermetically sealingly supported for vertical movement by the lower half 22 of the outer cylinder via an O-ring 36. A vertical movement drive 50 (FIGS. 3 and 4) is coupled to the lower end of the cylinder 10 projecting downwardly from the lower half 22 of the outer cylinder. In the vertical movement drive 50, a rotary shaft 52 of a handle 51 is pivotally mounted on a bracket 31 mounted on the base frame 30. A worm 53 provided on the rotary shaft 52 is in mesh with a worm wheel 54 journalled in the bracket 31. A gear 56 of a worm wheel shaft 55 is in mesh with a rack 57 provided on the outer periphery of a lower portion of the cylinder 10. With this construction, by rotating the handle 51 of the vertical movement drive 50, the cylinder 10 is vertically moved for adjusting the radial gap or aperture of the compressed air discharged port 7 (FIG. 5), thereby adjusting the speed of compressed air discharged from the port 7. Also, it is readily possible to remove the cylinder 10 from the outer cylinder 20 and install a cylinder of a different diameter. The extent of adjustment of the aperture is determined by a scale or graduation (not shown).

Figure 3:
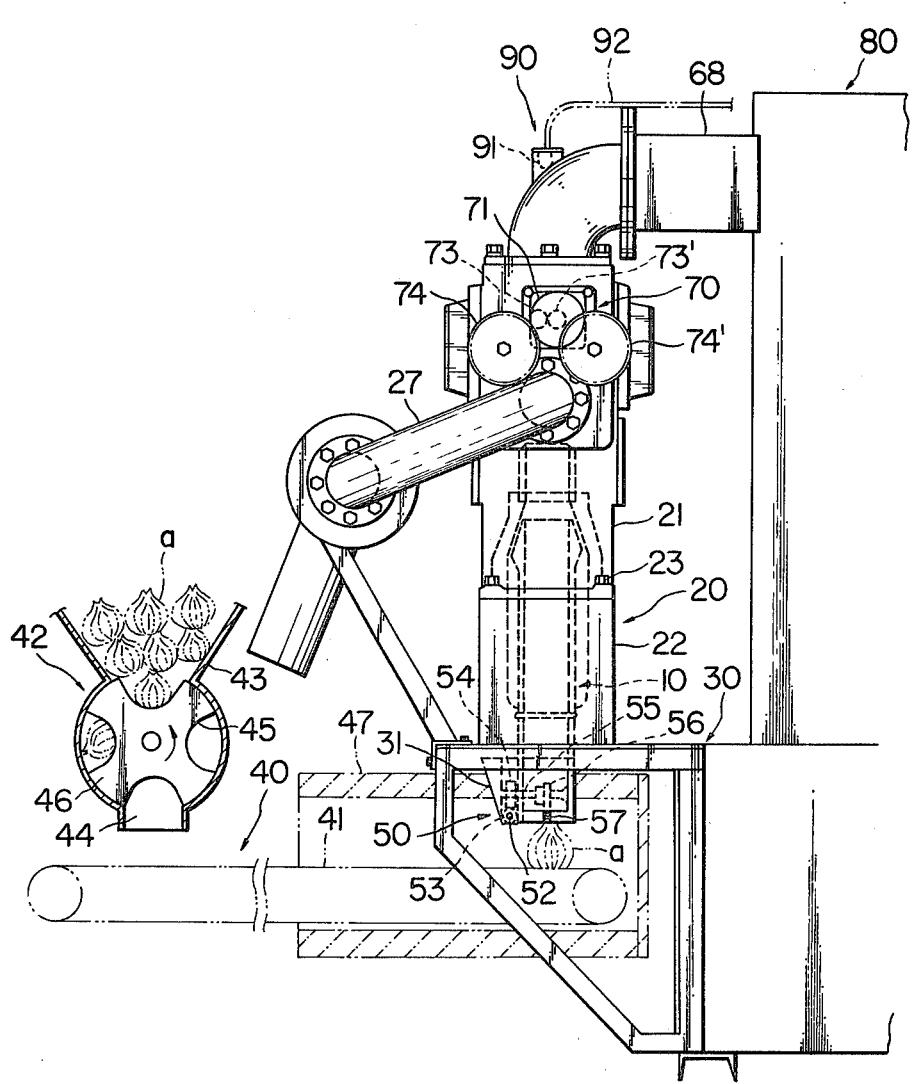
FIG. 3 is a detailed elevational view of the apparatus of FIG. 1.

The onion feeder 40 (FIG. 1) provided below the cylinder 10 includes an ordinary belt conveyor 41 (FIG. 3) for transporting onions having a size suited to the inner diameter of the path 1 one after another, and an onion separating and feeding device 42 is provided near the leading end of the belt conveyor 41. As schematically shown in FIG. 3, the separating and feeding device 42 includes a hopper 43 capable of accomodating a number of onions having a suitable size and a separating rotor 46 provided in a lower outlet 44 of the hopper and having pockets 45 each capable of accommodating one onion. The neighborhood of the position of the belt conveyor 41 where onions (a) are supplied one after another to the path 1 is surrounded by a muffler 47 consisting of a suitable sound absorber for muffling the withdrawing sound. The muffler 47 is suitably of a box-like form open only on the side from which onions are brought in. A lower portion of the cylinder 10 is inserted into the inside of the box-like muffler 47 from above.

Figure 10:
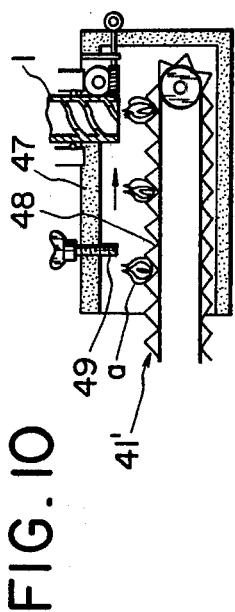
FIG. 10 is a pictorial sectional side view showing a different example of an onion feeder.

FIG. 10 shows a different example of the onion feeder 40. It includes a conveyor 41' provided with hill and valley portions alternately arranged at a predetermined interval. Here, one onion is put in each valley portion. If two or more onions are put in the valley portion 48, extra onions are removed from the conveyor 41' by a removing bar 49 in the form of, for instance, a bolt provided in the proximity of an intermediate portion of the belt conveyor 41'. Further, although not shown, it is possible to use an ordinary bucket conveyor for transporting onions one after another.

Figure 6:
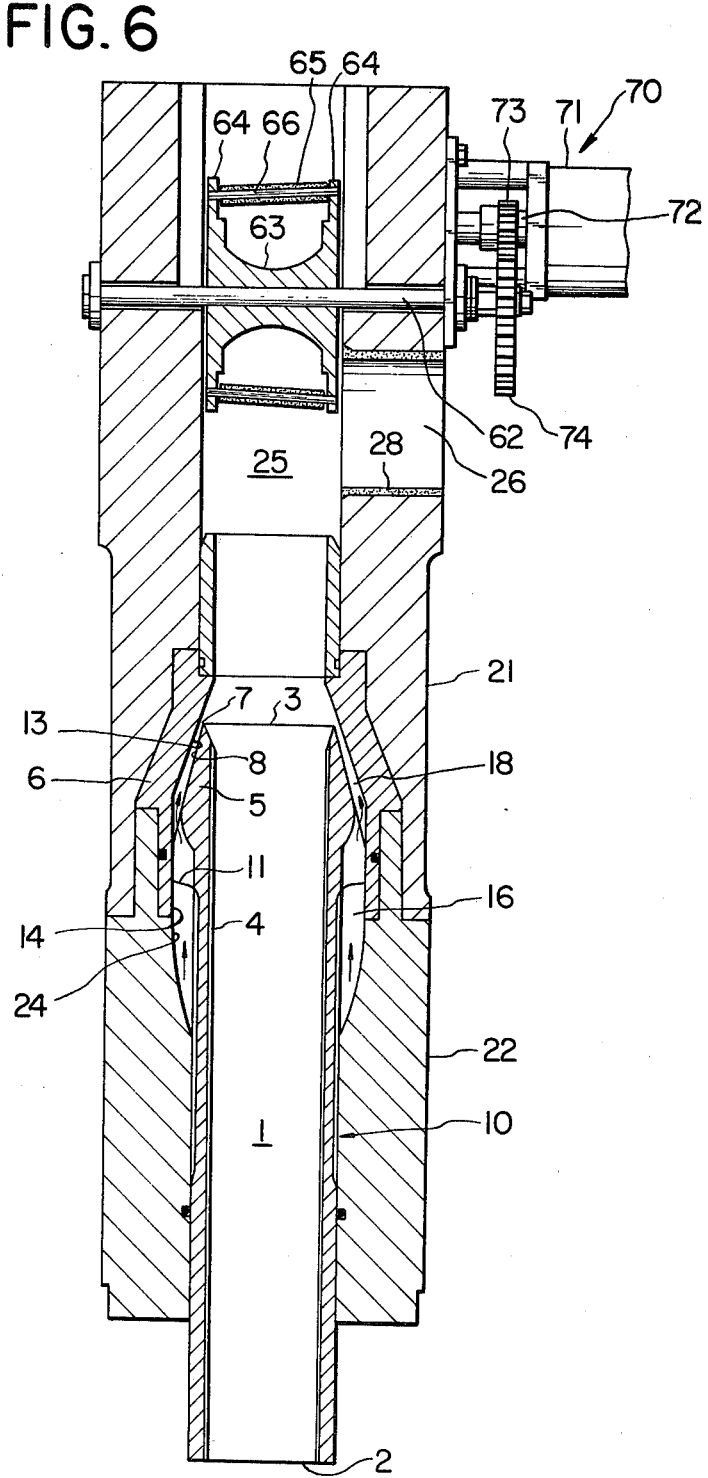
FIG. 6 is a longitudinal sectional side view showing the outer cylinder of FIG. 5.
Figure 9:
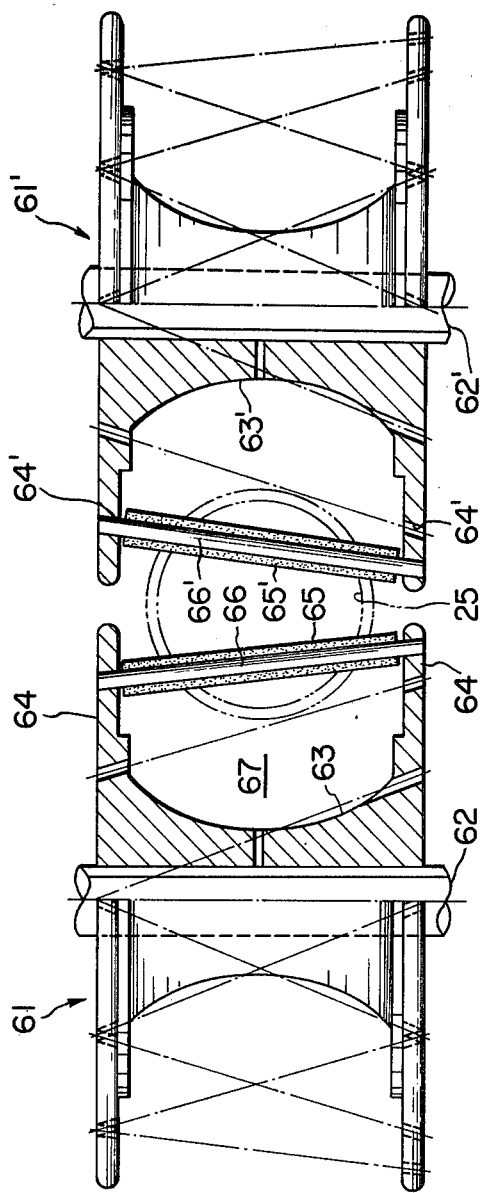
FIG. 9 is a partial sectional view of two rotors taken along line III—III in FIG. 5.

In the interior of the upper half 21 of the outer cylinder, a separating chamber 25 (FIG. 5) which substantially constitutes a cylindrical path is disposed to face the outlet 3 of the path 1. The separating chamber 25 is provided coaxially with respect to the path 1, and its inner diameter is the same as or slightly greater than that of the path 1. For obtaining satisfactory results, the separating chamber 25 is formed to have a length of at least 100 mm (3.94 inch) from the point O of intersection of the blow-out action lines of compressed air from the compressed air blow-out structure 15. This is because the mechanical strength with which the onion shell is attached varies with the size of onion and origin of onion (such as whether it is produced at home or abroad) and it is necessary to let compressed air strike the onion of whatever size or origin. A special direction converter 60 is provided in a further chamber which is located above the separating chamber 25. As shown in FIGS. 5, 6 and 9, left side and right side rotors 61 and 61' are provided above the separating chamber 25 such that they are rotated in opposite directions. These rotors 61 and 61' respectively include rotors 63 and 63' having a concave periphery and mounted on shafts 62 and 62'. They also each include a number of bars 66 and 66' covered by buffering members 65 and 65' such as rubber. These bars 66 and 66' are mounted in a circumferentially spaced-apart relation between pairs of side walls 64 and 64' of the rotors 63 and 63' such that they are inclined with respect to the axial direction of the shafts 62 and 62'. The bars 66 and 66' of the left and right side rotors are inclined in the same direction when viewed from the side, and as a stripped onion (b) strikes these inclined bars 66 and 66', the axial direction of its discharge is converted into a lateral or radial direction.

The peripheral or side wall of the separating chamber 25 is provided with a stripped onion outlet 26, through which the stripped onion (b) after the conversion of the direction of movement thereof is led out. The outlet 26 communicates with the upper half of the outer cylinder 21 via a conduit or guide path 27. Designated at 28 (FIG. 5) is a buffering film mounted on the periphery of the outlet 26.

The left and right side rotors 63 and 63' facing each other form a path 67 (FIG. 9) having oval, circular or similar sectional profile above the separating chamber 25. The path 67 serves to guide peelings (c) separated from the onion stripped in the separating chamber 25. The path 67 communicates at one end with the top of the upper half 21 of the outer cylinder, and communicates at the other end with a curved conduit which in turn communicates with a conduit or guide path 68 which extends to a cyclone type separator 80.

Figure 4:
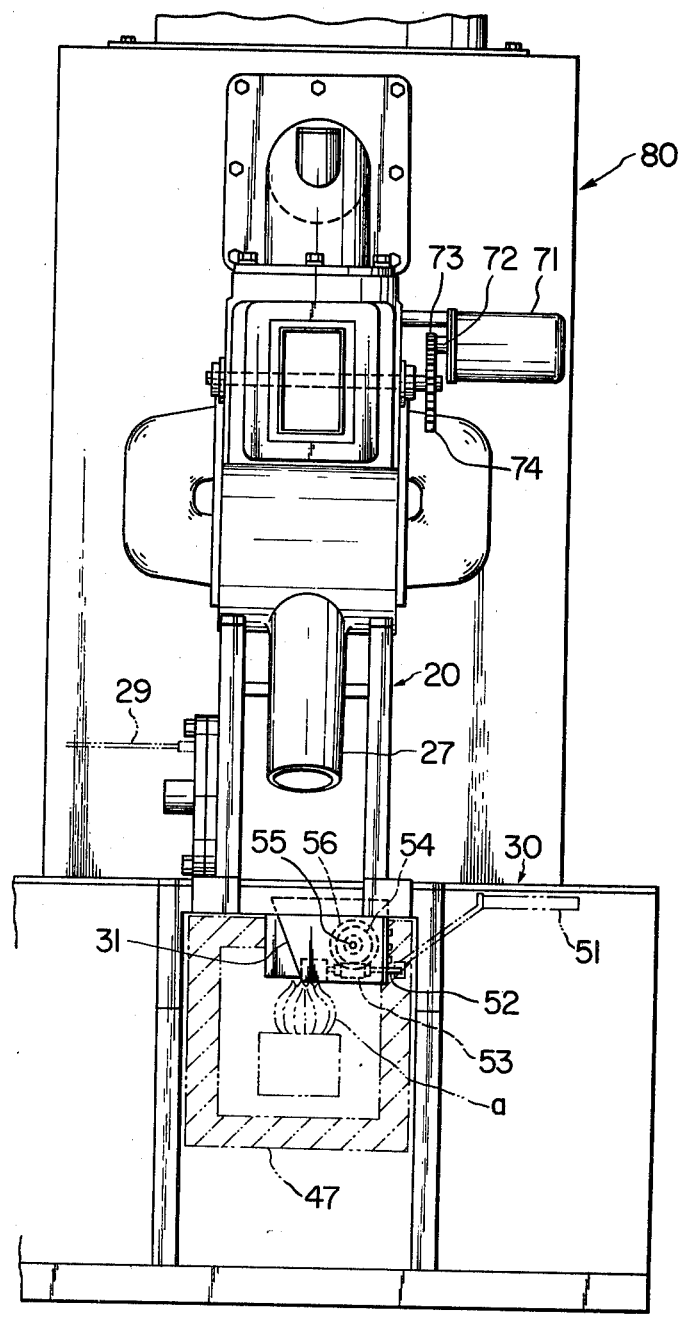
FIG. 4 is a side view of the apparatus of FIG. 3.

The left and right side rotors 61 and 61' are driven by a rotor drive 70 (FIGS. 3 and 4). The rotor drive 70 includes a motor 71 with a reduction gear supported on the upper half 21 of the outer cylinder. The output shaft 72 of the motor 71 is provided with a small gear 73' in mesh with a small gear 73 mounted on the outer wall of the upper half 21 of the outer cylinder. The small gears 73 and 73' are also in mesh with large gears 74 and 74' mounted on the shafts 62 and 62' of the left and right side rotors 61 and 61' so that the rotors 61 and 61' can be rotated in the opposite directions.

Figure 2:
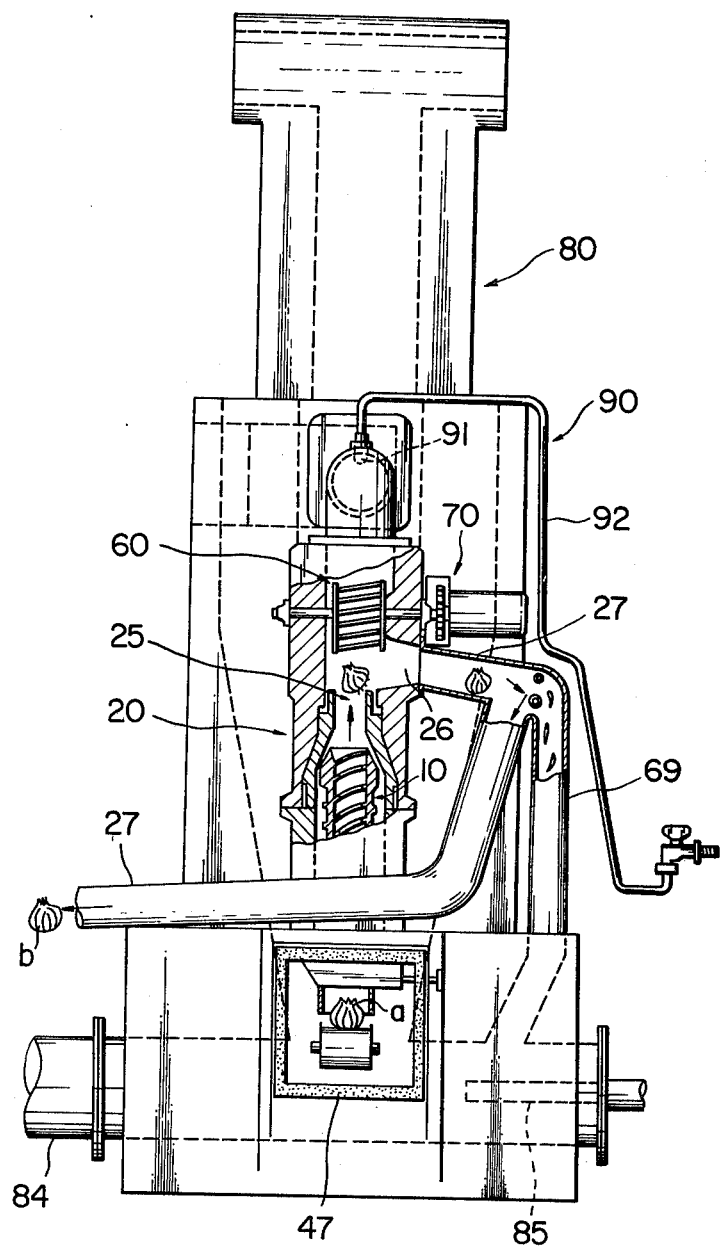
FIG. 2 is a side view, partly broken away showing the apparatus of FIG. 1.

As shown in FIGS. 1 and 2, the cyclone separator 80, with which the guide path 68 communicates, includes a cyclone cylinder 81 for capturing peelings (c) separated from the onion and an air exhausting cylinder 82 communicating with the top of the cyclone cylinder 81. The entirety of the cyclone cylinder 81 and most of the air exhausting cylinder 82 are surrounded by a muffler 83 consisting of a suitable sound absorber for muffling the exhausting sound. The bottom of the cyclone cylinder 81 communicates with a peelings discharge conduit or path 84, and peelings (c) collected in the discharge path 84 are propelled therethrough by an air nozzle 85 provided inside the path 84. Although not shown, the outlet end of the discharge path 84 is provided with a filter bag for collecting the peelings (c) without causing them to be dispersed. Further, since it is likely that part of the peelings (c) is led together with the stripped onion (b) through the stripped onion guide path 27, a second peelings conduit or guide path 69 is provided to branch from a juncture portion of the guide path 27 between a gently inclined portion and a sharply inclined bent portion. The other end of the guide path 69 communicates with the peelings discharge path 84.

A cleaning structure 90 is provided for cleaning the interior of the outer cylinder 20. It includes a water jet nozzle 91 mounted in a curved portion of the guide path 68 and in communication with a water source (not shown) via a water supply duct 92.

Now, the operation and effect of the embodiment having the above construction will be described.

Onions (a) having a size suited to the inner diameter of the path 1 are supplied one after another at a predetermined interval to a position right beneath the cylinder 10. As the separating rotor 46 in the separating and feeding device 42 is rotated at a uniform speed, a number of onions placed into the hopper 43 are accommodated each in a respective pocket 45 and are fed from the lower outlet 44 onto the conveyor belt 41 one after another spaced by a predetermined interval.

Compressed air is being discharged at a high speed from the compressed air discharge port 7 of the compressed air discharge structure 15 provided on the outer periphery of the upper portion of the cylinder 10. As compressed air enters the compressed air guide path 16 from the inlet 17, it is caused to execute helical motion by the contact with the helical grooves 12 provided on the outer periphery of the cylinder 10. Then, as it subsequently passes through the helical grooves 9 in the helical blades 11, it is further deflected. It then passes through the inclined path 18 to be blown out as a conical vortex from the compressed air discharge port 7. Thus, a vacuum is produced in the inside of the conical vortex, i.e., at the outlet 3 of the path 1 defined by the cylinder 10. This vacuum is suddenly increased when an onion (a) is located at the position right beneath the inlet 2 of the path 1. As a result, the onion (a) is drawn at a high speed into the path 1. The gap or aperture of the compressed air discharge port 7 is adjusted such that a sufficient air speed can be obtained for stripping the onion (a) thus picked up. The adjustment of this aperture is effected by the vertical movement drive 50 coupled to the lower end of the cylinder 10. More particularly, as the handle 51 is rotated, the worm wheel 54 is rotated via the worm 53, thus causing ascent or descent of the rack 57 provided on the outer periphery of a lower portion of the cylinder 10 via the gear 56 which moves the cylinder 10 in the same direction. Since the upper and intermediate portions of the cylinder 10 are supported coaxially and for vertical movement by the upper and lower halves 21 and 22 of the outer cylinder 22 as mentioned earlier, the aperture of the annular compressed air discharge port 7 can be uniformly increased or reduced.

As the onion (a) drawn into the path 1 as mentioned above rises at a high speed through the path 1, it is caused to spin by the helical grooves 4 provided on the inner peripheral wall of the cylinder 10. Thus, the onion (a) proceeds straight while spinning through the path 1 and is discharged from the outlet 3. At this time, it is discharged correctly toward the center of the upper separating chamber 25 due to its momentum and also by the action of the aforementioned vortex. Since the path 1 is formed to have an inner diameter capable of passing only a single onion, there is no possibility of picking up two or more onions at a time, and the next onion is picked up only after the preceding one is discharged.

In the separating chamber 25, the vortex of air as mentioned above strikes the onion (a) at a high speed and different angles as the onion (a) passes through the separating chamber 25. Thus, a shell portion or outer skin (c) of the onion (a) is blown apart, and the onion (a) is neatly stripped. Since the separating chamber 25 is in the form of a cylindrical path, there is no possibility for the vortex of compressed air discharged into this chamber to become a turbulent flow. Thus, the speed of compressed air is not attenuated, but the onion entering the separating chamber 25 is struck by compressed air at a necessary speed for stripping. The peelings (c) separated from the onion (a) are blown out of the chamber 25 by the high speed vortex action of the compressed air. Since only a single onion (a) is allowed to pass through the separating chamber 25 at a time, clogging will never result. Further, since the onion (a) is led to the center of the separating chamber 25 while it is spinning, there is no possibility for the onion to strike the peripheral wall of the separating chamber 25 and be given a, bruise or similar damage.

The stripped onion (b) strikes some of the inclined bars 66 and 66' of the left side and right side rotors 61 and 61' of the direction converter 60, rotating in opposite directions above the separating chamber 25, and as a result the axial direction of its progress is converted into a lateral or radial direction by the horizontal component of the reaction force exerted at this time by the rotors, so that it is discharged through the outlet 26 and guide path 27 to the outside. Since the axial direction of progress of the onion is converted, as soon as it is stripped, into the lateral direction by the direction converter 60 so that it is promptly discharged to the outside of the outer cylinder, there is no possibility for two or more onions to be retained at a time in the separating chamber 25. As a result, no clogging occurs in the separating chamber 25. The buffering members 65 and 65' prevent a bruise or other damages to the stripped onion (b) when the onion strikes the inclined bars 66 and 66'.

The majority of the peelings (c) separated from the onion (a) rise through the path 67 formed by the concave peripheries of the rotors 63 and 63' of the left side and right side rotors 61 and 61' to be led into the cyclone separator 80 via the guide path 68. As they enter the cyclone separator 80, they are captured in the cyclone cylinder 81, while clean air is discharged through the air exhausting cylinder 82 into the atmosphere. The peelings (c) that are collected at the bottom of the cyclone cylinder 81 (containing fine pieces of onion, root pieces thereof and dust attached to the shell as well as the peelings) are conveyed through the discharge path 84 by the air nozzle 85 and are collected at the outside. The portion of the peelings (c) that is led together with the stripped onion (b) into path 27, is separated from the onion (b) by the second peelings guide path 69 which branches from the stripped onion guide path 27 and join the major portion of peelings (c) which have been led via the route of the cyclone cylinder 81 and all the peelings are discharged through the discharge path 84 as described before.

For cleaning the interior of the outer cylinder 20 after the use of the apparatus according to the invention, cleaning water (sometimes containing a chemical) is supplied to the water jet nozzle 91 after completely closing the compressed air discharge port 7 by operating the vertical movement drive 50.

The embodiment of the invention described above is given for the purpose of illustration only, and various changes and modifications are possible without departing from the scope of the invention. For example, while in the above embodiment the onion was withdrawn vertically upwards, it is also possible to cause movement of the onion in an inclined direction or even in the horizontal direction. Further, while in the above embodiment the compressed air from the compressed air discharge structure 15 was rendered into a vortex, this is not essential but is only desireable. In other words, the compressed air may be blown out in the form of an air film having a conical shape or a similar shape. Further, in the direction converter 60 the rotors 63 and 63' having the concave periphery provided as the left side and right side rotors 61 and 61' may be omitted. Further, the inclined bars 66 and 66' may be inclined in opposite directions when viewed from the side. Actually, the onion does not always pass through the center of the separating chamber 25 but passes through it in a slightly eccentric state, and therefore the onion strikes either one of the opposite side bars inclined in the opposite directions. In this case, a further outlet is provided on the opposite side from the stripped onion outlet 26.

What is claimed is:

1. An apparatus for stripping onions, comprising means defining a generally cylindrical onion guide path having a diameter only slightly greater than that of the onions to be stripped; means defining a generally cylindrical separating chamber adjacent a first end of and substantially coaxial with said onion guide path, said separating chamber having a diameter at least as large as that of said onion guide path; means for supplying an onion to be stripped to an inlet location in the region of a second end of said onion guide path which is remote from said first end thereof; and compressed air discharge means in the region of said first end of said onion guide path for producing a jet of air which flows from the periphery of said onion guide path in a direction toward said separating chamber and for producing a vacuum in said onion guide path which causes an onion at said inlet location to be drawn into and propelled through said onion guide path and said separating chamber, said jet of air striking the onion as it passes through said separating chamber and causing an outer skin of the onion to be stripped off.

2. The apparatus for stripping onions according to claim 1, wherein said compressed air discharge means includes an annular compressed air discharge port encircling said onion guide path at said first end thereof, means defining a frusto-conical passageway which encircles said onion guide path, converges in said direction and communicates with said discharge port, means for supplying compressed air to said frusto-conical passageway and means for imparting a helical movement to compressed air flowing through said frusto-conical passageway.

3. The apparatus for stripping onions according to claim 2, wherein said jet of compressed air from said compressed air discharge means is generally conical and converges to a point located on the axis of said onion guide path.

4. The apparatus for stripping onions according to claim 2, wherein said jet of compressed air from said compressed air discharge means is generally conical, converges to a point located on the axis of said onion guide path, and flows generally helically.

5. The apparatus for stripping onions according to claim 2, wherein said means defining said onion guide path includes a cylinder having a coaxial central opening therethrough which is said onion guide path and includes an outer member having a cylindrical opening in which said cylinder is coaxially supported for slidable movement in the axial direction of said cylinder, said second end of said cylinder projecting from said outer member; including means for varying the radial width of said annular compressed air discharge port in response to relative axial movement of said cylinder and said member and including selectively actuable drive means for effecting axial movement of said cylinder relative to said outer member to facilitate adjustment of the radial width of said annular compressed air discharge port and to facilitate removal and reinstallation of said cylinder in said outer member.

6. The apparatus for stripping onions according to claim 5, wherein said cylinder has an outwardly facing frusto-conical surface thereon at said first end of said onion guide path which converges in said direction, and wherein said cylindrical opening in said outer member has an inwardly facing frusto-conical surface thereon which faces said frusto-conical surface on said cylinder and converges in said direction, said frusto-conical passageway being the region between said frusto-conical surfaces on said cylinder and outer member.

7. The apparatus for stripping onions according to claim 1, wherein said jet of compressed air from said compressed air discharge means is generally conical and converges to a point located on the axis of said onion guide path, and wherein said separating chamber extends at least 100 mm (3.94 inch) in said direction beyond said point of convergence of said jet of compressed air from said compressed air discharge means.

8. The apparatus for stripping onions according to claim 1, including means defining a further chamber on a side of said separating chamber remote from said onion guide path, said further chamber communicating with said separating chamber and having an onion outlet opening in a side wall thereof, and including means provided in said further chamber for converting the direction of movement of a stripped onion from movement along the axis of said separating chamber in said direction into movement in a lateral direction generally radially outwardly from the axis of said separating chamber and toward said onion outlet opening.

9. The apparatus for stripping onions according to claim 8, wherein said direction converting means includes a pair of rotors supported for rotation in opposite directions about respective spaced, generally parallel axes, each said rotor having two axially spaced, radially outwardly extending side walls and having a plurality of circumferentially spaced bars which are each encircled by a sleevelike buffering member and extend between said side walls of the rotor at an angle with respect to the axis of rotation of the rotor.

10. The apparatus for stripping onions according to claim 1, including means defining a further chamber on a side of said separating chamber remote from said onion guide path, said further chamber communicating with said separating chamber and having an onion outlet opening in a side wall thereof, and including means provided in said further chamber for converting the direction of movement of a stripped onion from movement along the axis of said separating chamber in said direction into movement in a lateral direction generally radially outwardly from the axis of said separating chamber and toward said onion outlet opening, and including a further opening in a wall of said further chamber and means providing communication between said further opening and a cyclone-type separator, said direction converting means including means for guiding the outer skin from a stripped onion into said further opening.

11. The apparatus for stripping onions according to claim 10, wherein said cyclone separator includes a cyclone cylinder, said means providing communication between said further opening and said cyclone separator communicating with said cyclone cylinder, said cyclone separator also including an air exhausting cylinder which communicates with an upper portion of said cyclone cylinder and means defining a discharge passageway which communicates with a lower portion of said cyclone cylinder, said discharge passageway being provided with an air nozzle which emits a stream of compressed air to convey the outer skins from the onions along said discharge passageway.

12. The apparatus for stripping onions according to claim 11, including means defining an onion passageway communicating with said further opening and a further passageway communicating with said onion passageway, and wherein said discharge passageway communicates with said further passageway.

13. The apparatus for stripping onions according to claim 11, wherein said cyclone separator is surrounded by a muffler.

14. The apparatus for stripping onions according to claim 11, wherein said means providing communication between said further opening and said cyclone separator includes a passageway having a curved portion which is provided with water jet nozzle means for supplying water to such passageway to facilitate cleaning of the inside of said apparatus.

15. The apparatus for stripping onions according to claim 1, wherein said means for supplying an onion includes means for supplying onions one after another at times spaced by a predetermined interval to said inlet location in the region of said second end of said onion guide path.

16. The apparatus for stripping onions according to claim 15, wherein a portion of said onion guide path in the region of said second end thereof is surrounded by a muffler.

17. The apparatus for stripping onions according to claim 1, wherein the surface of said onion guide path is provided with helical grooves which cause each onion to spin as it moves through said onion guide path and said separating chamber.

18. The apparatus for stripping onions according to claim 1, wherein said onion guide path extends generally vertically, said first end thereof being the upper end thereof.

* * * * *